United States Patent [19]

Hulsing, II et al.

[11] 4,428,123
[45] Jan. 31, 1984

[54] INSTRUMENT MOUNTING

[75] Inventors: Rand H. Hulsing, II; John A. Morrow, both of Redmond, Wash.

[73] Assignee: Sundstrand Data Control, Inc., Redmond, Wash.

[21] Appl. No.: 343,561

[22] Filed: Jan. 28, 1982

[51] Int. Cl.³ .......................................... E21B 47/022
[52] U.S. Cl. ....................................... 33/313; 33/350
[58] Field of Search ................ 33/304, 302, 305, 308, 33/313, 314, 312, 350

[56] References Cited

U.S. PATENT DOCUMENTS 1,823,336 9/1931 Shakhnazarov ................ 33/313 X
2,187,028 1/1940 Hendrickson .
2,190,790 2/1940 Humphreys ..................... 33/313 X
2,255,295 9/1941 Miller .................................. 33/314
3,791,043 2/1974 Russell .

4,141,153 2/1979 Nelson .

Primary Examiner—Harry N. Haroian
Attorney, Agent, or Firm—Wood, Dalton, Phillips, Mason & Rowe

[57] ABSTRACT

An improved mounting between a cylindrical package, containing a sensitive instrument, and a protective cylindrical housing disposed thereabout. Plugs at opposite ends of the housing each have a conical recess opening toward the other plug and between which the package is confined. O-rings at each end of the package engage the tapered wall of the adjacent recess and absorb longitudinal and radial shock and center the package within the housing. To restrain relative rotational movement between the housing and instrument package, a plurality of coil springs are disposed within aligned bores in an end of the package and the adjacent plug.

17 Claims, 3 Drawing Figures

INSTRUMENT MOUNTING

BACKGROUND OF THE INVENTION

Measuring instruments, such as inclinometers, are commonly employed by the oil industry in downhole operations. Typically, the measuring instrument is contained inside a package which is in turn assembled within a protective cylindrical housing. The instrument may be subjected to large shock forces, which, without internal damping, might occasion instrument failure resulting in time consuming and costly shutdown.

One attempt to obviate this problem is shown in U.S. Pat. No. 4,141,153, to Nelson. In Nelson, the instrument package is supported at either end between a pair of coil springs, which serve primarily to dampen longitudinal shock. However, there are no disclosed means to absorb radial shock. Consequently, the package, which is fit closely within the housing opening, might move laterally and be jarred against the walls of the housing. Further, the package is substantially free to rotate relative to and against the housing which might cause damage to the instrument.

The present invention is directed specifically to overcoming the problems enumerated above.

SUMMARY OF THE INVENTION

The present invention is an improved mounting between a cylindrical package, containing a sensitive instrument, and a protective cylindrical housing, disposed thereabout. Plugs are included at opposite ends of the housing, between which the package is confined. Each plug includes a conical recess opening towards the other plug. The package has reduced end portions which are received within the recesses. An O-ring is compressed between the reduced portions of the package and the tapered walls of the recess.

It is the principal object of the present invention to incorporate multi-directional shock isolation capability into the mounting between a cylindrical instrument package and outer housing.

The O-rings, between the ends of the package and the tapered walls of the plugs, absorb both longitudinal and radial shock. To enhance the radial shock absorption, a plurality of resilient aligning members are disposed peripherally about the package and are compressed between the package and housing.

In a preferred form of the invention, a compression seal cap is situated at the lower end of the housing between the end of the package and the adjacent plug. The seal cap includes a conical recess opening toward the opposite plug, which recess receives the end of the package. A loading spring is interposed between the seal cap and the adjacent plug. The spring, in conjunction with the O-ring at the end of the package, absorbs longitudinal shock induced at the nose of the housing.

It is another object of the invention to maintain the package centrally within the housing so that no undesired contact occurs between the package and the housing.

The aforementioned arrangement between the ends of the package and the tapered walls of the plugs, defining the conical recesses, positively locates the ends of the package in the center of the housing. In a preferred form, a plurality of the resilient aligning members are disposed peripherally about the instrument package. Preferably, the members are resilient O-rings which are retained in annular grooves at spaced intervals along the length of the package. The frictional forces, between the O-ring and the package and housing, resist longitudinal movement of the package relative to the housing as well as keeping the package centered within the housing.

It is a further object of the present invention to provide means for restraining relative rotational movement between the housing and package. To accomplish this end, at least one elongate resilient member is arranged longitudinally and extends within aligned bores at an end of the package and the adjacent plug. In a preferred form, the member is a coil spring with spaced turns, and a plurality of such members are disposed circumferentially and equidistantly about the package and the plugs.

DETAILED DESCRIPTION OF THE DRAWINGS

Figure 1:
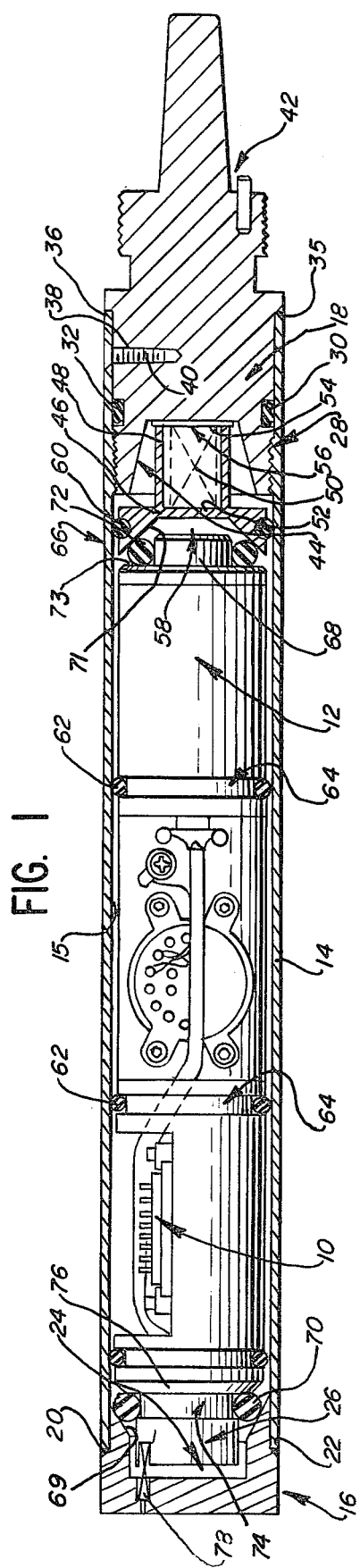
FIG. 1 is a longitudinal cross-sectional view of a housing carrying an inclinometer package and incorporating the improved mounting of the present invention.

Referring initially to FIG. 1, an inclinometer 10 is illustrated, contained within a cylindrical instrument package 12. A preferred form of the mounting of the present invention is included between the package 12 and a protective cylindrical housing 14 mounted thereabout. The package has a slightly smaller diameter than the housing, such that an annular gap 15 is formed therebetween. First and second plugs 16, 18 are included adjacent the upper and lower ends of the housing, respectively. The inclinometer may, for example, be suspended from a cable (not shown) attached to end plug 16 and lowered into the borehole of an oil well.

Figure 2:
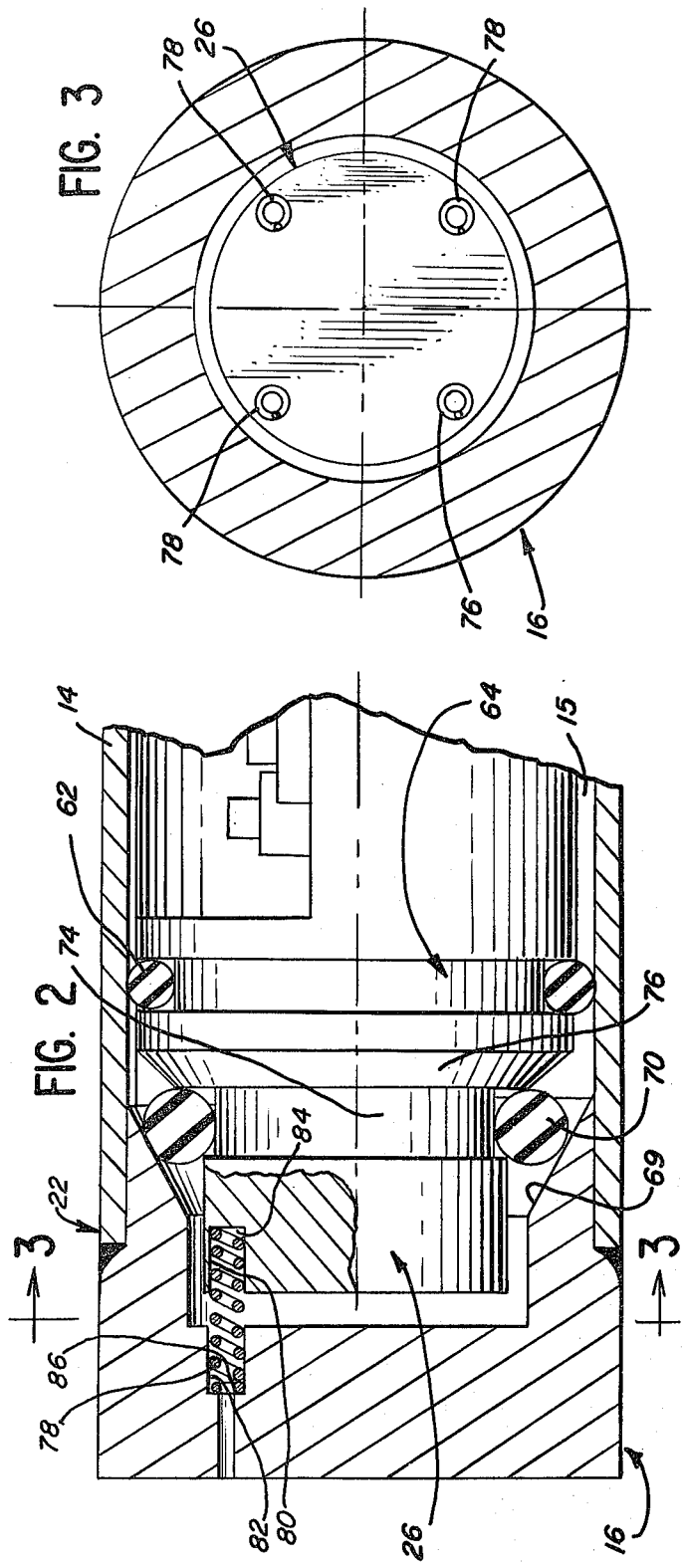
FIG. 2 is an enlarged fragmentary section view of the left end of the housing of FIG. 1 showing the means restraining relative rotational movement between the package and housing.

The upper plug 16 is received internally of the housing 14 and includes an annular shoulder 20 which abuts the upper edge 22 (FIG. 2) of the housing 14, with the plug fully seated. The plug 16 includes a conical recess 24 opening towards the bottom of the housing and accommodates a reduced end portion 26 of the package 12.

The lower plug 18 is threadably engaged at 28 within the housing 14. An O-ring 30, retained within an annular groove 32, is compressed and seals between the plug 18 and the housing 14. With the plug 18 fully seated, a shoulder 35 on the plug 18 seats against the lower rim 36 of the housing. A locator pin 38 extends through the housing and into a bore 40 in the plug 18 to fix the position of the housing and plug. The plug includes a conical recess 44 opening toward the top of the housing. At the lower end of the plug is an integrally formed, tapered coupling 42 which is threaded to make connection with a suitable fitting (not shown).

A compression seal cap 46 is interposed between the lower end of the package 12 and the second plug 18. The seal cap has a centrally located, downwardly opening cylindrical chamber 48 within which a coil loading spring 50 is closely received. The spring 50 is retained between the bottom wall 52 of the chamber and a protective shim 54 situated over the upwardly facing wall 56 of the plug 18, defining the recess 44. The upper region of the seal cap 46 includes a conical recess 58 opening toward the top of the housing. An O-ring 60 surrounds the seal cap and engages between the cap and the housing to maintain the cap positively centered within the housing. The loading spring 50 is arranged between the bottom of the package and the lower plug, to afford additional damping for shocks induced by an impact at the leading edge of the housing as it is lowered downhole.

The package 12 is captured at its ends between the plugs 16, 18 which confine longitudinal movement thereof. To assure that the package 12 and housing 14 are axially aligned, O-rings 62 are disposed peripherally about the package within annular grooves 64, at spaced intervals along the length of the package. The O-rings 62 are compressed between the package and the housing and expanded longitudinally into the annular gap 15 and absorb much of the radial shock.

The lower region of the package 12 includes a reduced diameter boss 68, which is axially aligned and extends from the lower edge 73 of the package. O-rings 70 and 72 are included, respectively, at the reduced top and bottom ends of the package. The bottom O-ring 72 fits closely over the plug 68 and abuts the downwardly facing wall 73 of the package. The upper ring 70 is fit within an annular groove 74 and abuts an inclined wall 76 at the end 26 of the package.

The O-rings 70, 72 are sufficiently thick that they engage, and are compressed between, the ends of the package and the tapered walls 69, 71, respectively, defining the conical recess in the first plug 16 and the compression seal cap. As the plug body 19 is threaded towards the upper edge of the housing, the spring 50 is compressed and loads the O-rings 70, 72 axially until the package is in the fully loaded position, illustrated in FIG. 1.

Figure 3:
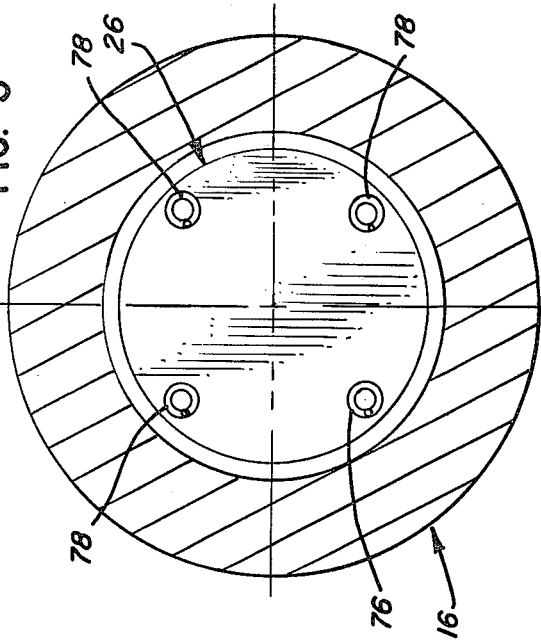
FIG. 3 is a sectional view of the rotational restraining means taken along line 3—3 of FIG. 2.

To prevent relative rotation between the package and housing, and to absorb additional longitudinal and radial shock, a plurality of elongate resilient members 78 are arranged longitudially and extended within aligned bores 80, 82, respectively, within the end of the package and the plug 16. In a preferred form, the members 78 are coil springs having spaced turns. The springs are of a diameter to fit closely within the openings 80, 82 and abut the walls 84, 86 at the ends of the bores, with the housing assembled as in FIG. 1. Through one such spring would suffice, four springs are preferably spaced circumferentially and equidistantly about the package 12 and plug 16, as indicated in FIG. 3.

It can be seen that the package is suspended in the space internally of the housing between the plug means 16, 18, cooperatively by the O-rings 62, 70, 72 and the coil spring 78. The O-rings 62, 70, 72 and springs 50, 78 absorb both longitudinal and radial shock. Relative rotational movement between the package and housing is restrained by the frictional forces between the O-rings 62, 70, 72 and the package and housing and additionally by the arrangement of the spring 78 between the package and plug 16.

We claim:

1. In a sensitive instrument for use in an environment where the instrument is subject to mechanical shock, the instrument having a cylindrical instrument package and a cylindrical outer housing, an improved mounting for the instrument package inside the housing, comprising:

first and second plugs at opposite ends of the housing and cooperatively capturing the ends of the package to confine longitudinal shifting of the package relative to the housing;

a conical recess in each of said first and second plugs, said recesses opening, each toward the other, receiving the ends of the instrument package and maintaining the instrument package substantially centered in the housing; and resilient cushion members between each plug and the adjacent end of the instrument package which absorb longitudinal and radial shock.

2. The instrument mounting of claim 1 wherein at least one resilient aligning member is disclosed peripherally about the package and compressed between the package and the interior of the protective housing intermediate the ends of the package to maintain the package centered radially within the housing.

3. The instrument mounting of claim 1 wherein said first plug is situated adjacent the lower end of the housing and a compression seal cap is disposed between the first plug and the adjacent end of the instrument package, said compression seal cap comprising a conical recess opening toward the second plug and receiving the adjacent end of the instrument package, and a loading spring interposed between the compression seal cap and the first plug.

4. The instrument mounting of claim 1 wherein said conical recesses are defined by tapered walls within the plugs and the resilient cushion members each comprise an O-ring which engages an end of the instrument package and the tapered walls of the adjacent conical recess.

5. In a sensitive instrument for use in an environment where the instrument is subject to mechanical shock, the instrument having a cylindrical instrument package and a cylindrical outer housing, an improved mounting for the instrument package inside the housing, comprising:

first and second plugs at opposite ends of the housing and cooperatively capturing the ends of the package to confine longitudinal shifting of the instrument package relative to the outer housing; and at least one elongate resilient member arranged longitudinally and extending within aligned bores at an end of the package and the adjacent plug, said elongate resilient member being flexible both longitudinally and radially so as to absorb longitudinal and radial shock and restrain relative rotational movement between the instrument package and the outer housing.

6. The instrument mounting of claim 5 including at least one resilient aligning member disposed peripherally about the instrument package and compressed between the instrument package and the interior of the outer housing intermediate the ends of the instrument package to maintain the instrument package centered radially within the housing and to absorb radial and longitudinal shock.

7. The instrument mounting of claim 5 wherein the elongate resilient member is a coil spring having spaced turns.

8. In a sensitive instrument for use in an environment where the instrument is subject to mechanical shock, the instrument having a cylindrical instrument package and cylindrical outer housing, an improved mounting for the instrument package inside the housing, comprising:

first and second plugs at opposite ends of the housing and cooperatively capturing the ends of the instrument package to confine longitudinal shifting of the package relative to the housing;

resilient cushion members between each end of the instrument package and the adjacent plug and serving to absorb longitudinal and radial shock; and at least one elongate resilient member arranged longitudinally and extending within aligned bores at an end of the package and the adjacent plug, said elongate resilient member being flexible both longitudinally and radially so as to absorb longitudinal and radial shock and restrain relative rotational movement between the package and the housing.

9. The instrument mounting of claim 8 wherein at least one resilient aligning member is disposed in an annular groove peripherally about the package and compressed between the package and the interior of the outer housing intermediate the ends of the package to maintain the package centered radially within the housing.

10. The instrument mounting of claim 8 wherein conical recesses are included in each of said plugs, each said recess opening toward the other, receiving an end of the package and maintaining the instrument package substantially centered in the housing.

11. The instrument mounting of claim 8 wherein a compression seal cap is disposed between an end of the instrument package and the adjacent plug, said seal cap comprising a conical recess opening toward the other plug and receiving the adjacent end of the instrument package, and a loading spring is interposed between the compression seal cap and the adjacent plug.

12. The instrument mounting of claim 8 wherein said elongate resilient member is a coil spring having spaced turns.

13. The instrument mounting of claim 8 wherein a plurality of resilient elongate members are disposed within a corresponding member of aligned bores disposed equidistantly about an end of the package and the adjacent plug.

14. The instrument mounting of claim 10 wherein the instrument has reduced end portions which are received within the conical recesses.

15. The instrument mounting of claim 11 wherein said compression seal cap includes a cylindrical chamber opening toward the adjacent plug within which chamber the loading spring is retained.

16. The instrument mounting of claim 14 wherein each said conical recess is defined by tapered walls in the plug and said resilient cushion member engages the reduced end portions of the package and the tapered walls in the adjacent plug.

17. The instrument mounting of claim 16 wherein the resilient cushion members are O-rings which are fit closely over the reduced end portions of the instrument package.

* * * * *